Patented Dec. 14, 1926.

1,610,864

UNITED STATES PATENT OFFICE.

VICTOR LEFEBURE, OF LONDON, ENGLAND.

CEMENT, CONCRETE, AND PLASTER.

No Drawing. Application filed February 29, 1924, Serial No. 695,966, and in Great Britain March 5, 1923.

According to this invention a cement of the type which, being a dry powder, like Portland cement or plaster of Paris, sets hard on admixture with a liquid (hereinafter referred to as a liquid-setting cement) is mixed with the coagulum obtained by partially or wholly coagulating rubber latex. The cementitious mass so produced is then caused to set either by the addition of water, or other liquid, or by the action of the water contained in the latex coagulum. Hot or cold vulcanizing agents may also be added, the vulcanization of the rubber contained in the mass being thereby effected with or without the application of heat as may be necessary.

The invention can be put into practice in a number of different ways. According to one way rubber latex is taken and, suitably coagulated, and then mixed with for example dry Portland cement, which sets by absorbing water from the rubber latex.

By another method rubber latex is mixed with a paste of the liquid setting cement and water say Portland cement and water, or gypsum and water, or the latex may be made into a paste with a powder termed a filler substantially inert to rubber and to the liquid setting cement and the said paste added to dry Portland cement powder, or gypsum, or to Portland cement or gypsum and water paste. The products made by these processes are hereinafter called unvulcanized rubber concretes.

I have found that the mode of separation of the rubber from the latex, and the physical form in which the rubber is separated are important. In general, the actual rubber should be thrown out in a state as finely divided as possible. This can be done by employing small percentages of a suitable coagulant such as alum, as is well-known in connection with latex and/or by precipitating the latex upon one of the fillers such as finely divided silica before or during the gauging of the Portland cement or plaster of Paris. The chemical nature of the cement or plaster will usually determine what method should be employed. For instance, with Portland cement, alum is used but with plaster of Paris I prefer to precipitate the rubber on an inert filler without the addition of a special precipitant.

A second form of product hereinafter called vulcanized rubber concrete, can also be made. One suitable process for manufacturing such a product is carried out by mixing either with the cement or the latex, or with both, sulphur and an accelerator, or other vulcanizing agents. The mixture is then given a suitable heat treatment, either at a high or at a low temperature according to the vulcanizing agent and the method of vulcanization used.

Heat may be applied to the mass during or after the setting period to effect vulcanization, but in the case of Portland cement the most suitable period seems to be between the initial and final sets. Heating by direct steam is a suitable method.

The products made by processes according to this invention can be applied to the manufacture of a composite product in which vulcanized rubber concrete, or unvulcanized rubber concrete, is laid in a layer on ordinary cement or cement concrete, or in which vulcanized or unvulcanized rubber is laid in a layer on vulcanized or unvulcanized rubber concrete. The layers adhere, and a layer of vulcanized or unvulcanized rubber can thus be affixed to a foundation of cement or concrete by means of an intervening layer of vulcanized or unvulcanized rubber concrete.

In many cases the addition of rubber weakens the final product as regards mechanical strength, but this can be overcome when necessary by the use of compression as in ordinary cement practice.

Both the unvulcanized and vulcanized rubber concretes possess the marked advantage of improving the texture and surface of the material, increasing its waterproof properties and enabling it to polish more readily.

The following specific instructions for practicing the preferred mode of the invention may be useful:—

100 parts by weight of Portland cement are gauged with water to consistency of a thick paste; from 20/25 parts of water are suitable for this purpose. Sufficient rubber latex is then taken to contain two parts by weight of rubber content. To this rubber latex is added sufficient of a dilute solution of alum with stirring, to finely coagulate the rubber. The quantities required vary so much according to the state of the latex, as will well be understood by rubber experts, that I do not specify definite quantities, although I would say that in a typical case I have worked with a 5 per cent solution of alum, and taken so much that one-fifth part of actual alum was present to coagulate latex containing two parts of rubber. This finely coagulated product is then added without separation to the thick paste of Portland cement and stirred to a thinner paste, which is allowed to set.

To make my meaning clearer, I would say that the resultant rubber concrete thus contains the following parts by weight:—Portland cement, 100; rubber, 2; alum, one-fifth.

Where the rubber concrete is required for the subsequent manufacture of the vulcanized rubber concrete, the accelerator and sulphur (and any other filler) are intimately mixed with the Portland cement prior to gauging with water, suitable quantities of sulphur and accelerator for the example above being: —sulphur, 1/10th of a part by weight; accelerator, 1/50th part by weight.

A suitable accelerator is tetramethyl thiuram disulphide. Alternatively I have worked by adding the rubber and the sulphur to the latex at the same time as the alum is added. In proceeding to a vulcanized rubber concrete the mass is allowed to take its initial set in a mould or former to give it the required shape, and is then taken out of the mould or former, usually allowed to thoroughly set and is then vulcanized, preferably in a steam heated chamber.

What I claim and desire to secure by Letters Patent is:—

1. A process for producing a mass of hardened cementitious material which comprises in mixing together a liquid-setting cement and finely coagulated rubber latex, thoroughly incorporating the said materials to produce a pasty mass, and giving the pasty mass so produced the required form.

2. A process for producing a mass of hardened cementitious material which comprises in mixing together a liquid-setting cement, the liquid necessary for the setting thereof, and finely coagulated rubber latex, thoroughly incorporating the said materials to produce a pasty mass, and giving the pasty mass so produced the required form.

3. A process for producing a mass of hardened cementitious material which comprises in mixing together a liquid setting cement, finely coagulated rubber latex, and a vulcanizing agent, thoroughly incorporating the said materials to produce a pasty mass, giving the pasty mass so produced the required form, and treating the said mass to vulcanize the rubber therein.

4. A process for producing a mass of hardened cementitious material which comprises in mixing together a liquid setting cement, finely coagulated latex, and a hot vulcanizing agent, thoroughly incorporating the said materials to produce a pasty mass, giving the said pasty mass the required form, and treating the said mass to effect the vulcanization of the rubber therein by the application of heat after the initial setting of the cement in the said mass has taken place.

5. A process for producing a mass of hardened cementitious material which comprises in mixing together Portland cement, finely coagulated rubber latex, and a hot vulcanizing agent, thoroughly incorporating the said materials to produce a pasty mass, giving the said pasty mass the required form, and treating the said mass to effect the vulcanization of the rubber therein by the application of heat after the initial setting of the cement in the said mass has taken place.

6. A process for producing a mass of hardened cementitious material which comprises in mixing together Portland cement, finely coagulated rubber latex, and a hot vulcanizing agent, thoroughly incorporating the said materials to produce a pasty mass, giving the pasty mass so produced the required form, and heating the said mass with direct steam between the initial and final setting of the cement to vulcanize the rubber therein.

7. A process for producing a mass of hardened cementitious material which comprises in mixing together Portland cement, a filler, finely coagulated rubber latex, and a hot vulcanizing agent, thoroughly incorporating the said materials to produce a pasty mass, giving the pasty mass so produced the required form, and heating the said mass with direct steam between the initial and final setting of the cement to vulcanize the rubber therein.

8. A mass of cementitious material comprising a layer which contains cement which has taken up liquid and set, and rubber finely and uniformly disseminated through the mass of the said cement.

9. A mass of cementitious material comprising a layer which contains cement which has taken up water and set and rubber finely and uniformly disseminated through the mass of the said cement.

10. A mass of cementitious material comprising a layer which contains Portland cement which has taken up water and set, and vulcanized rubber finely and uniformly disseminated through the mass of the said cement.

11. A mass of cementitious material containing Portland cement which has taken up water and set, and vulcanized rubber finely and uniformly disseminated through the interstices thereof; the said mass being adherent to a mass of material containing Portland cement which has taken up water and set and unvulcanized rubber finely disseminated through the interstices thereof.

12. A composition of matter which comprises a liquid-setting cement and rubber, in intimate uniform admixture therewith.

13. A composition of matter which comprises a water setting cement, and rubber in intimate uniform admixture therewith.

14. A composition of matter which comprises a water setting cement and vulcanized rubber in intimate uniform admixture.

15. A composition of matter which comprises Portland cement which has taken up water and set, and vulcanized rubber in intimate uniform admixture therewith.

16. A mass of cementitious material which comprises in intimate uniform admixture Portland cement which has taken up water and set and vulcanized rubber finely and uniformly disseminated throughout the mass thereof, surrounding the particles of a subdivided filling material to form a concrete.

17. A composition of matter which contains principally a hydraulic cement and contains also combined water and finely and uniformly distributed rubber, which is hard, strong, waterproof, and capable of taking a polish.

In testimony whereof I have signed my name to this specification.

VICTOR LEFEBURE.